(No Model.)

R. SCHROEDTER.
WHEEL AND AXLE FOR VEHICLES.

No. 602,475. Patented Apr. 19, 1898.

WITNESSES
Hermann Heinz
Wm R Rummler

INVENTOR
Richard Schroedter
BY Alfred Meltzer
his ATT'Y.

THE NORRIS PETERS CO., PHOTO-LITHO., WASHINGTON, D. C.

UNITED STATES PATENT OFFICE.

RICHARD SCHROEDTER, OF CHICAGO, ILLINOIS.

WHEEL AND AXLE FOR VEHICLES.

SPECIFICATION forming part of Letters Patent No. 602,475, dated April 19, 1898.

Application filed July 19, 1897. Serial No. 645,060. (No model.)

*To all whom it may concern:*

Be it known that I, RICHARD SCHROEDTER, a citizen of the United States, residing at Chicago, in the county of Cook and State of Illinois, have invented a new and useful Improvement in Wheels and Axles for Vehicles, of which the following is a specification.

My invention relates to wheels and axles for vehicles. Its objects are to reduce the friction, to prevent uneven wear on the axle and hub, to provide a wheel in which the spokes can be readily replaced, and to provide an improved rim and tread. I accomplish these objects by the device illustrated in the accompanying drawings, in which—

Figure 1:
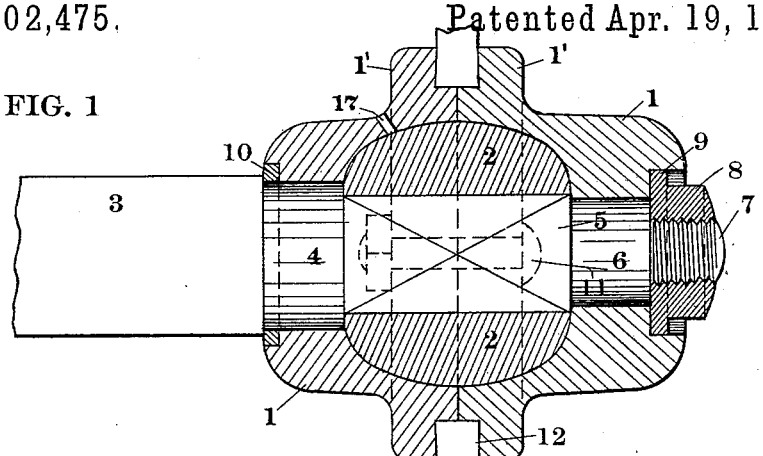
Figure 2:
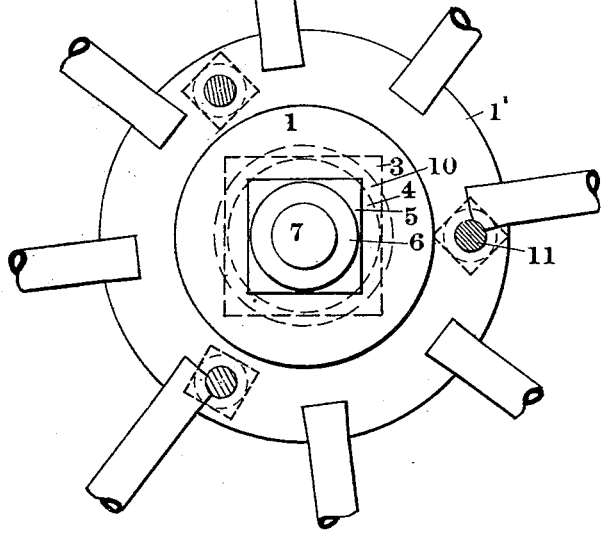

Figure 1 is a vertical section of a hub and axle constructed according to my invention, taken on a plane extending longitudinally of the axle, showing also a transverse section of the rim of the wheel with the connecting-spoke partly broken away. Fig. 2 is an end view of the same construction with the outer half of the hub 1 and the washer 9 and nut 8 removed, the spokes and rim being partly broken away.

The hub 1 is made in two parts, hollowed out to receive the ball 2 and flanged at 1' for engaging the spokes and for fastening the two parts of the hub together. The recess 12 is enlarged toward the middle of the hub, and the spokes 13 are enlarged at their inner ends, so as to fit the recess 12, and thus fasten the spokes in the hub when the two parts of the hub are secured together.

The axle consists of the shank or inner part 3, the rounded bearing-surfaces 4 and 6, the squared part 5, and the threaded end 7.

The ball 2 is cut out to fit the squared part 5 of the axle. The ball 2 furnishes the main bearing-surface for the hub.

The ball 2 and the hub are preferably made of brass or other metal which is softer than ordinary steel.

The spokes are preferably tubular, the inner ends being flared to fit the recess 12 and the outer ends being interiorly threaded for fastening to the rim 14 by means of the screws 15.

The rim 14 is concavo-convex and preferably hollow.

The tread 16 is made of elastic material, which may be rubber for light vehicles and Manila rope or other tough fabric for heavy vehicles.

The two parts of the hub are fastened together by means of the bolts 11.

It will be seen that the parts of the wheel may be readily separated for inserting new spokes.

The principal feature of the bearing provided by my hub and axle is that same is of oval form, so that a broad contact of the hub and axle is secured even when a strong side pressure is exerted on the wheel.

In the old form of bearing when the vehicle is running along an incline, so that a side pressure is exerted against the wheel, it is plain that there are but two narrow surfaces of contact between the hub and axle, being respectively on the under side of the axle at one end of the hub and on the upper side of the axle at the other end of the hub. It is plain that this wears on both axle and hub, so as to cut into same much more than if a broad bearing-surface is presented, as in my device.

In my device while there will be a pressure on parts 4 and 6, as in the ordinary construction, there will also be a pressure of the hub upon the ball 2 at opposite points corresponding to the points of contact on the parts 4 and 6. One advantage of this is that a much narrower hub may be used, thus making a lighter wheel than in the old construction.

I do not confine myself to the use of the particular form of spokes and rim shown, although I prefer same.

The spokes may be plugged at the inner end if thin metal is used. It will be seen that such spokes may be readily formed out of ordinary metal tubing.

My form of rim provides for both strength and lightness of weight and is designed to be made of metal.

Having described my invention, what I claim, and desire to secure by Letters Patent, is—

1. In a wheel and axle for vehicles the combination of a hub consisting of the two separable parts 1, cut out to inclose the oval member 2, and having the flanges 1' with recesses 12 therein which are enlarged toward the middle of the hub; an axle having thereon the member 2; and spokes having their inner ends enlarged to fit the recesses 12, substantially as described.

2. In a wheel for vehicles, the combination of a hub consisting of two separable parts 1, having the flanges 1' with recesses 12 therein which are enlarged toward the middle of the hub; the tubular metal spokes, having their inner ends flared to fit said recesses and their outer ends interiorly threaded; and a rim having screws thereon engaging said interiorly-threaded parts, substantially as described.

RICHARD SCHROEDTER.

Witnesses:
WM. R. RUMMLER,
ALFRED MELTZER.